(12) United States Patent
Dugas (10) Patent No.: US 6,857,788 B1
(45) Date of Patent: Feb. 22, 2005

(54) REMOVABLE COUPLING OF AN OPTO-ELECTRONIC MODULE INTO A FRONT ACCESS RACK

(75) Inventor: Roger Dugas, Chester, NH (US)

(73) Assignee: Xanoptix Inc., Merrimack, NH (US)

( * ) Notice: Subject to any disclaimer, the term of this patent is extended or adjusted under 35 U.S.C. 154(b) by 0 days.

(21) Appl. No.: 10/641,195

(22) Filed: Aug. 13, 2003

(51) Int. Cl.[7] .................................................. G02B 6/38
(52) U.S. Cl. ......................................................... 385/75
(58) Field of Search ............................. 385/75, 88, 89, 385/92, 94

(56) References Cited

U.S. PATENT DOCUMENTS

| | | | | |
|---|---|---|---|---|
| 5,555,341 A | * | 9/1996 | Sharma et al. | 385/129 |
| 6,511,345 B1 | * | 1/2003 | Hwang | 439/541.5 |

* cited by examiner

Primary Examiner—Javaid H. Nasri
(74) Attorney, Agent, or Firm—Morgan & Finnegan, LLP (57) ABSTRACT

A system and method to facilitate receipt of an optoelectronic module in a first direction and make an electrical connection by movement of the module in a second direction different from the first direction.

21 Claims, 9 Drawing Sheets

REMOVABLE COUPLING OF AN OPTO-ELECTRONIC MODULE INTO A FRONT ACCESS RACK

FIELD OF THE INVENTION

The present invention relates to electrically connecting an opto-electronic module to a printed circuit board.

BACKGROUND

Opto-electronic modules are modules that transmit and/or receive data optically, for example, using lasers or receivers. An optical connector of some type provides for data passage between the optical devices in the module and other optical components. Typically, such modules also send and/or receive electrical signals, for example, via an electrical connector on a printed circuit board or a backplane. In general, an optical device, which is found in the module, requires several electrical connections. Due to the large number of optical devices that may be present in the module, the number of electrical connections can be numerous. Thus, depending upon the number of optical devices, for space considerations the electrical connector can be configured as a linear or, for a larger of number of optical devices, a two-dimensional array.

In instances where multiple modules are used, they are typically configured in front loading rack-mount systems, which contain racks for receiving modules in much the same way as the frame of a household dresser receives a drawer. Connectors mounted on a backplane at the rear of the drawer or rack mate with connectors mounted on the modules when the modules are seated. Since each rack can contain from a few to hundreds of modules, for ease of maintenance it is important that each module can be serviced (i.e. inserted or removed) independent of as many, preferably every, other module(s) because each unrelated module that must be disrupted in the course of servicing another represents lost capability and, accordingly, potential loss of time and/or revenue. As a result, modules are configured so that they can be inserted and removed through the front panel of the front loading rack-mount system to avoid having to disengage the rack from the backplane and thereby potentially disrupt the operation of one or more unaffected modules.

As the demand for optical communication capability increases, the need for greater numbers of optical devices will similarly increase. However, as noted above, greater numbers of optical devices generally result in larger modules and much larger electrical connectors. Hence, the number of modules that can be fit within a given size front loading rack-mount system decreases. Moreover, since the size of the connector (due to increased numbers of pins or other contact elements) grows faster than the number of devices, the ability to fit more modules within a given size front loading rack-mount system quickly becomes limited by the connector size.

Figure 1:
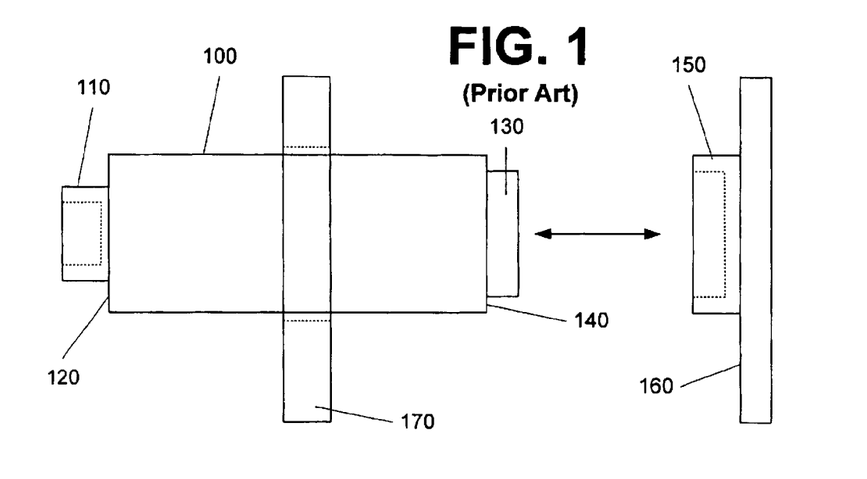
FIG. 1 shows an exemplary opto-electronic module of the prior art.

For example, FIG. 1 shows an exemplary opto-electronic module 100 of the prior art. The module 100 has an optical connector 110 on its front side 120 providing access to, in this example, twenty-four optical devices (not shown) such as lasers and/or photoelectors and an electrical connector 130 on its back side 140. The electrical connector 130 is configured to pass through the front panel 170 of the rack (not shown) in order to mate with a complementary connector 150 on a circuit board or a backplane 160 at the rear of the rack. Thus, for ease of maintenance, the connection between the module 100 and the backplane 160 is made by insertion of the module 100 longitudinally through the front panel 170 towards the backplane 160 until the two connectors 130, 150 mate.

Figure 2:
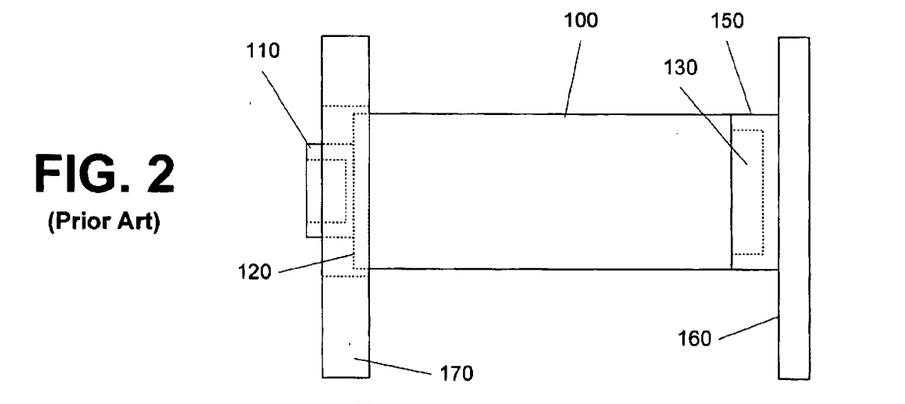
FIG. 2 shows the module of FIG. 1 following the mating of two connectors.

FIG. 2 shows the module 100 of FIG. 1 following mating of the two connectors 130, 150 in the above described manner.

Figure 3:
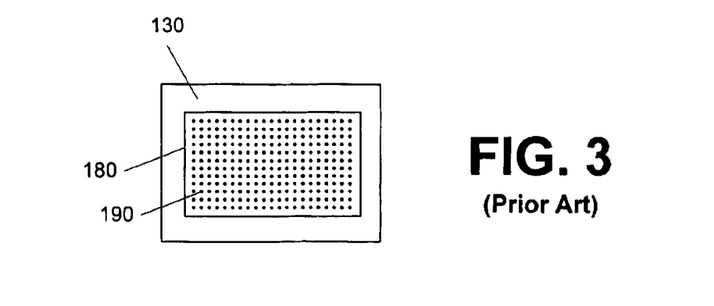
FIG. 3 is a rear view of the module of FIG. 1 so that the module's connector is visible.

FIG. 3 is a rear view of the module 100 of FIG. 1 so that the electrical connector 130 is visible. The electrical connector 130 has an array 180 of pins 190 through which electrical signals can pass between the module 100 and the backplane 160. As noted above, and as is typically the case, the size of the electrical connector on the back side is much larger and contains many more pins than the number of optical devices. Thus, it will be recognized that a mere doubling of the number of optical devices in this example to forty-eight may result in no change in the overall of the module 100 but may require a connector approaching twice the illustrated overall area and thereby far exceed the overall area taken up by the back of the module. As a result, for a given size drawer, the crossover point between increased devices per module versus total number of modules that can be accommodated can shift to a net loss quite quickly.

Thus, there is presently no easy way, for a given size front panel accessible drawer of a rack and a given size and number of modules, to substantially increase the number of optical devices.

SUMMARY OF THE INVENTION

We have recognized that, because the bottom of the module has a larger surface area than the rear of the module (i.e. it can accommodate a larger connector within its boundaries), moving the connector to the bottom of the module solves part of the problem. However, since the electrical connector is then actually or substantially perpendicular to the optical connector, movement of the electrical connector to the bottom detrimentally affects front panel accessibility, since longitudinal insertion of the module through the front panel does not allow for making the electrical connection because it requires movement of the module in a direction other than the direction of insertion. Advantageously, we have developed a way that allows such modules (i) to be used in a front loading rack despite the electrical connector being on the bottom of the module, and (ii) make the electrical connection. As a result, the bottom connector modules can still be independently serviced while causing minimum, and in many cases no disruption to surrounding modules. Through use of a device that receives the module through the front panel (for example, in a plane defined by the module's electrical connector) and can then move the module in the direction necessary to make the electrical connection (for example, substantially perpendicular to the plane defined by the module's electrical connector) the above problems are addressed.

The above advantages and features are of representative embodiments only, and are presented only to assist in understanding the invention. It should be understood that they are not to be considered limitations on the invention as defined by the claims, or limitations on equivalents to the claims. For instance, some of these advantages may seem mutually contradictory, in that they cannot be simultaneously implemented in a single embodiment. Similarly, some advantages are primarily applicable to one aspect of the invention. Thus, this summary of features and advantages should not be considered dispositive in determining equivalence. Additional features and advantages of the invention will become apparent in the following description, from the drawings, and from the claims.

DETAILED DESCRIPTION

In general, a device is used that receives the opto-electronic module through the faceplate of the rack drawer (e.g. in a plane defined by the module's electrical connector) and then moves the module in a direction substantially perpendicular to the plane of the electrical connector to connect the module to the printed circuit board. This approach enables an increasing number of opto-electronic devices to be contained in the opto-electronic module (due to the additional area provided by positioning the electrical connector at the bottom of the module) while still providing insertion and removal of the module through the front panel of a front loading rack-mount system. Moreover, the number of devices is only limited by the area defined substantially by the width of the module and the depth of the rack drawer (i.e. the frontal area can remain the same but the electrical connector size can be increased depth-wise until a limit related to the depth of the rack is reached).

Figure 4:
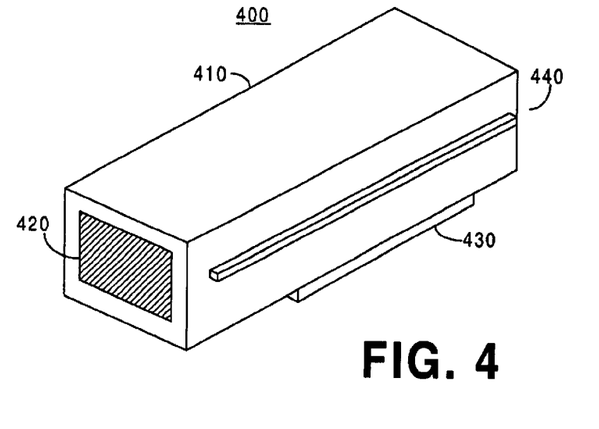
FIG. 4 shows a simplified example of an opto-electronic module configured for use in accordance with the present invention.

FIG. 4 shows a simplified example of an opto-electronic module 400, for example, an opto-electronic transmitter, receiver or transceiver configured for use in accordance with the present invention. As shown in FIG. 4, the opto-electronic module 400 is oblong in shape and also contains various optical and electronic components (not shown because the details are unimportant for understanding the invention). The module 400 includes a body 410. The module 400 also includes an optical connector 420 and an electrical connector 430 positioned such that they define a pair of planes substantially perpendicular to one another. The electrical connector 430 is configured for mating with a complementary electrical connector located on, for example, a printed circuit board. The module 400 further includes at least one guide structure 440, shown for purposes of example, in the form of a rail positioned on a side of the body 410.

By way of background, the optical connector 420 is the interface through which optically encoded data signals pass when transiting between the module 400 and elsewhere.

If optically encoded data signals are received by the module 400 through the optical connector 420, they are converted into electrical signals (by the module's 400 internal components) and, in some cases, are further transmitted electrically elsewhere via the electrical connector 430.

Similarly, if electrically encoded data will be transmitted optically by the module 400, it is received by the module 400 via the electrical connector 430. The data is then converted to optically encoded data within the module before being transmitted from the module 400 via the optical connector 420.

In the case of a transceiver, the optical connector 420 and the electrical connector 430 together provide for the bi-directional transmission of data through the module 400 as described above.

Figure 5:
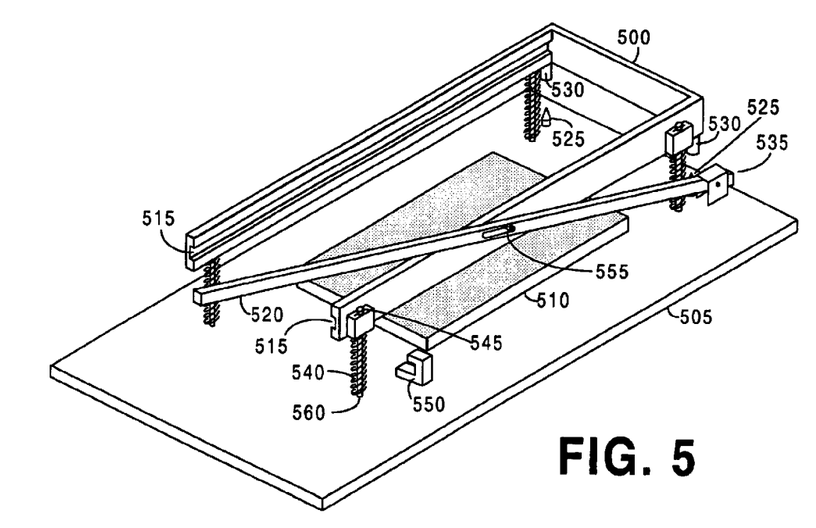
FIG. 5 shows, for example, the implementation of a device suitable for use with the present invention.

FIG. 5 shows, by way of example, one example implementation of a device suitable for use with the present invention. A frame 500 has an opening on its front for receiving a module and two guides 515, one on each side, configured to accept a complementary pair of guides of an opto-electronic module. The frame 500 is configured to also move in a direction other than that of module insertion, for example, slidably along several posts 560. As shown in this example, the posts 560 are perpendicular to the plane of the frame 500 and are encircled by springs 540 that urge the frame 500 into a normally disengaged position, for this implementation, that is away from the printed circuit board 505. To prevent the guides 515 from being urged off the posts 560 by the force of the springs 540 if necessary, a retaining clip or pin 545 is provided at the top of at least one of the posts 560.

The frame 500 of FIG. 5 is also coupled to a lever 520 that moves the frame 500 from a normally disengaged position to an engaged position. The lever 520 is connected to the frame 500 by a pin through a slot 555 in the lever 520 or some other suitable known manner. A lock 550 is optionally provided to secure the lever 520 when the lever 520 is in an engaged position. Optionally, the frame 500 may also or alternatively include alignment features, for example, one or more alignment boss(es) 530 or alignment pin(s). One or more complementary elements, for example, tapered pins 525, on the circuit board 505 can be used to engage the, in this example, bosses(es) 530 to, in different implementations, act as stops for when the frame 500 is in an engaged position and/or assist in alignment by forcing the frame into a particular position in the X-Y plane.

In general, the frame is configured to move an opto-electronic module in a direction other than the direction of the module's insertion so that its electrical connector will mate with its complementary electrical connector. Thus, for the example of FIG. 4 and FIG. 5, the process of mating the two electrical connectors 430, 510 proceeds as follows. The module 400 of FIG. 4 is inserted into the frame 500. By aligning the guide 440 with the complementary guide 515 in the frame 500 and, then longitudinally inserting the module 400 through the front panel into the frame 500, in this example, along a plane defined by the electrical connector 430 so that it becomes secured in the frame 500. The guide 440 of FIG. 4 is thus used to align, constrain and control insertion of the module 400 into the frame 500. Once the module 400 is fully inserted into the frame 500 the lever 520 is moved downward to cause the frame 500 to move the module 400 in a direction substantially perpendicular to its electrical connector 430 to connect or disconnect the electrical connector 430 of the module 400 to the electrical connector 510 of the circuit board 505. This movement is referred to as "substantially" perpendicular because, depending upon the implementation some pivotal, arcuate or other translational movement beyond pure perpendicular movement can also be involved.

As the frame 500 is moved downward, if one or more of the optional alignment bosses 530 are used, movement of the lever 520 to mate the electrical connectors 430, 510 will cause the alignment bosses 530 to act in conjunction with the tapered pins 525 to, in the example shown, center and thereby ensure proper x-y alignment of the electrical connector 430 relative to its complementary connector 510.

Once the electrical connectors 430, 510 are mated, if the urging spring force is too great it can cause the electrical connectors 430, 510 to separate unintentionally. In such cases, a lock 550 can be optionally used to secure the frame 500 in the engaged position, for example, by constraining or clamping the lever 520. By releasing the lever 520 from the lock 550 (i.e. unclamping the lock 550) the spring force alone and/or moving the lever 520 in an upward direction will cause the electrical connectors 430, 510 to become disengaged.

Figure 6:
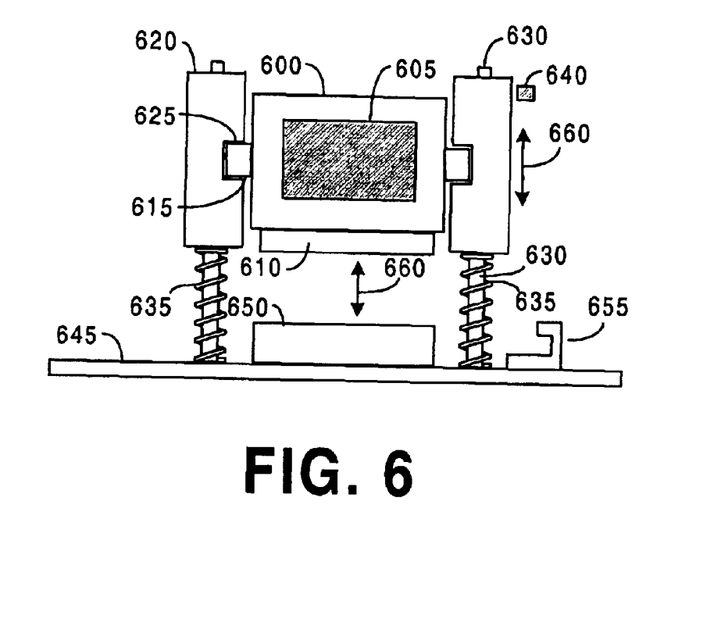
FIG. 6 is a simplified front view of an opto-electronic module seated in a frame similar to that shown in FIG. 5 in accordance with the present invention.

FIG. 6 is a simplified front view of an opto-electronic module that has been inserted through the front faceplate of a rack drawer (not shown) so it is now seated in a frame similar to that shown in FIG. 5 in accordance with the present invention. As shown in FIG. 6, the opto-electronic module 600 includes an optical connector 605 on its front, an electrical connector 610 on its bottom side and two guides 615 each in the form of a rectangular rail. A frame 620 includes two guides 625 each in the form of a channel and is positioned to slidably move along at least two posts 630 each encircled by a spring 635. The frame 620 accurately positions the electrical connector 610 over the electrical connector 650 on the circuit board 645 so that no alignment boss is required. A lock 655 is provided on the circuit board 645 to maintain the lever 640 in the lower position when the module 600 is seated and the electrical connectors 610, 650 are mated.

Figure 7:
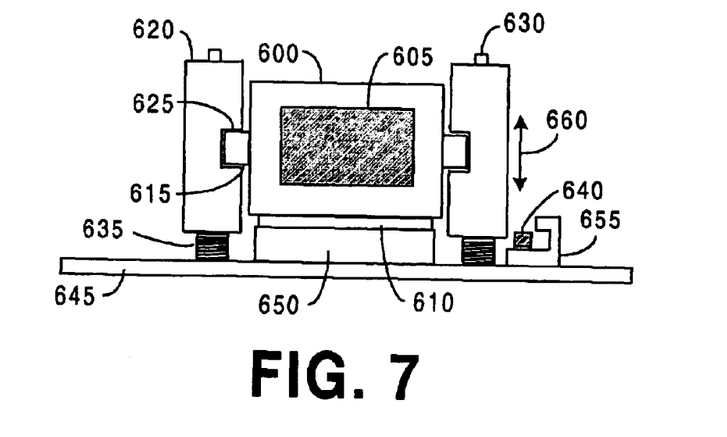
FIG. 7 is a front view of the opto-electronic module of FIG. 6 following the mating of two connectors in accordance with the present invention.

FIG. 7 is a front view of the opto-electronic module 600 of FIG. 6 following the mating of the electrical connectors 610, 650 in accordance with the present invention. As shown in FIG. 7, the lever 640 has been moved downward (along the arrow 660) bringing the frame 620 in a downward direction to compress the springs 635 and cause the mating of the connectors 610, 650. As illustrated, the lever 640 is positioned just prior to being secured by the lock 655 through slight movement to the side. Releasing the lever 640 from the lock 655 (i.e. unclamping the lock 655) and moving the lever 640 in the opposite direction along the arrow 660 disengages the electrical connectors 610, 650 and moves the frame 620 towards a position where the module 600 can be removed from the rack via the front panel. Thereafter, once the frame 620 reaches the position shown in FIG. 6, in order to remove the module 600, a user need only pull the module 600 from the frame 620 and need not disturb any other adjacent or nearly module.

Figures 8, 9:
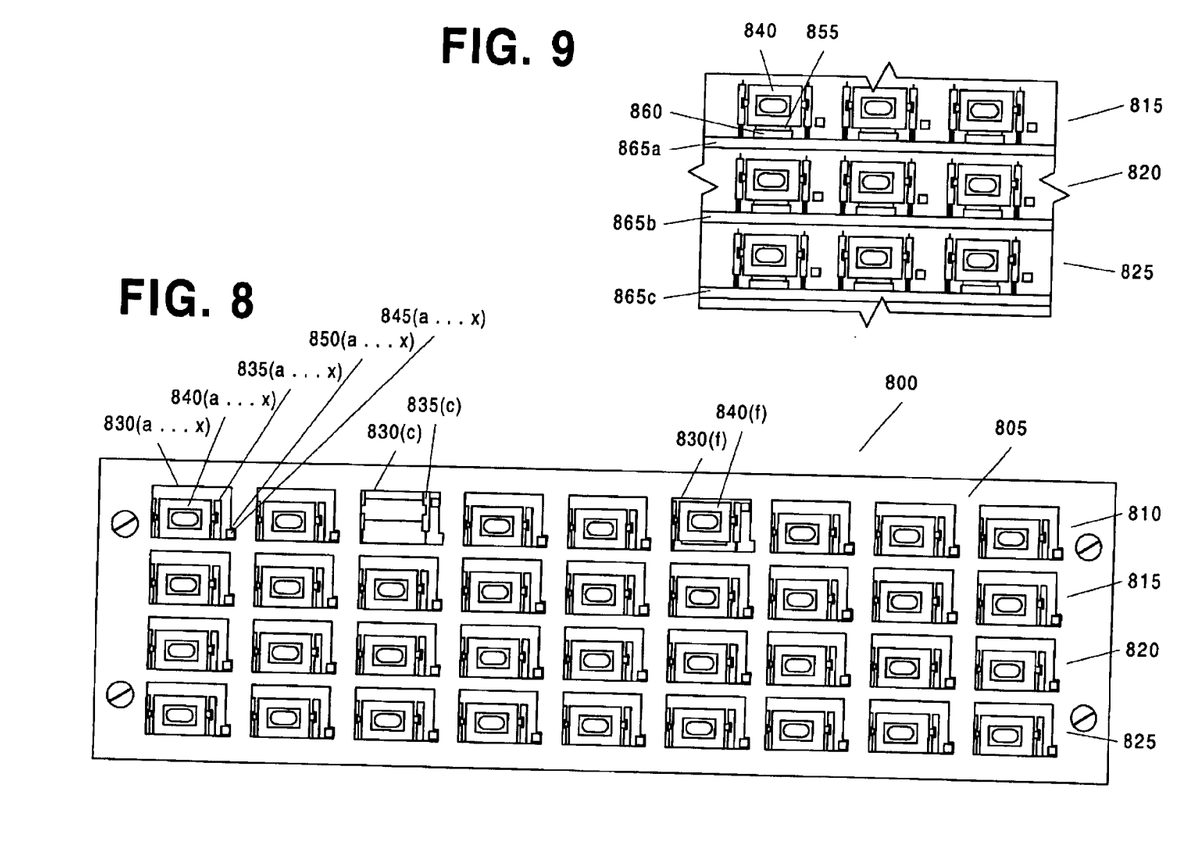
FIG. 8 is a front view of an example rack from a front loading rack-mount system implementing the present invention with its front panel in place.
FIG. 9 is a partial internal view of the rack of FIG. 8 with its front panel removed.

FIG. 8 is a front view of an example rack 800 from a front loading rack-mount system implementing the present invention, viewed from the front, with its front panel 805 in place. As shown in FIG. 8, the rack 800 includes a front panel 805 and several rows 810, 815, 820, 825 of slots 830(a . . . x) each having frames 835(a . . . x) as described above. As shown, each frame 835(a . . . x) includes a lever 845(a . . . x) and an optional lock 850(a . . . x) similar to that described above. In general, the openings in the front panel 805 are dimensionally slightly larger than the modules 840(a . . . x) to allow for clearance of the guides and unmated part of the electrical connector on each of the modules 840(a . . . x). As shown, each of the modules 840(a . . . x) in the lower three rows 815, 820 825 is seated such that their individual electrical connectors (not shown) are mated. This is nevertheless evident from the levers 845(a . . . x) being secured in the downward position by the locks 850(a . . . x).

As further shown in FIG. 8, the uppermost row 810 includes an empty slot 830c, such that the frame 835c is visible. Another slot 830f contains a module 840f that has been disengaged so that it is ready for removal. The module 840f is removed by simply pulling the module 840f outward from the frame 835f FIG. 9 is a partial internal view of a portion of three rows 815, 820, 825 in the example rack 800 of FIG. 8 viewed as if its front panel 805 was removed. As shown in FIG. 9, the electrical connectors 855(a . . . x) of the modules 840(a . . . x) are mated to the electrical connectors 860(a . . . x) of several printed circuit boards 865a, 865b, 865c that would not be visible with the front panel 805 in place. In the example of FIG. 8 and FIG. 9, the printed circuit boards 865(a . . . x) can also be removable and may, in turn, be connected to components via, for example, backplane or cabling (not shown) at the rear of this drawer of the rack 800.

Although the above examples have all used guides of square cross section formed as rails, in alternative variants of the present invention, guides of different sizes, forms and shapes can be used. This, different guides can be used as a form of "keying" to ensure that only the correct modules can be inserted and/or accepted into a particular frame. In this manner, for example, it is possible to differentiate between two modules using the same physical connectors but having incompatible electrical differences, for example, reversed power and ground connections or reversed data input and output connections. Similarly, this approach makes it possible to provide a visual commonality to a family of modules while preserving a difference among individual modules in the family. For example, all modules in a particular family of modules could have a specific size and shape left side guide but be differentiated from others in the family through different and incompatible right side guides.

Figure 10:
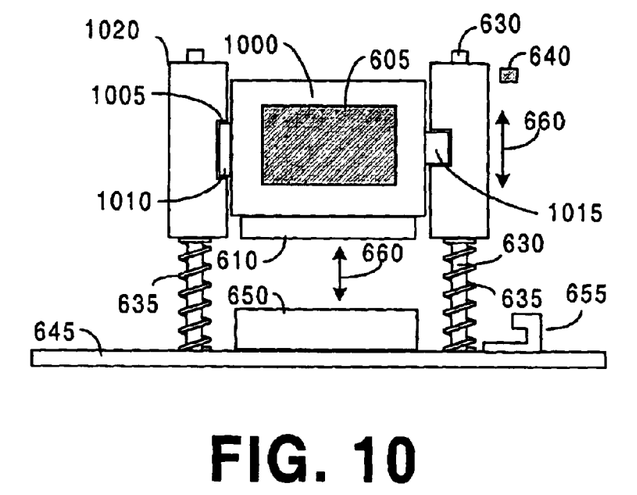
FIG. 10 shows an alternative variant in accordance with the present invention.

FIG. 10 shows an alternative variant in accordance with the present invention. In this example, the guides 1010, 1015 on the module 1000 are each still in the form of rails, but each is of a different cross sectional shape and size. Complementary guides 1005, 1025 in the form of channels on the frame 1030 are configured to accept the guide 1010, 1015 as described above. Because the guides on the left side 1005, 1010 and right side 1015, 1025 are incompatibly different with respect to each other, the module 1000 can only be inserted in the manner shown and another module, such as the module 600 of FIG. 6 and FIG. 7, could not be used because its left side rail 615 could not be accommodated by the channel 1005 of the left side frame 1020 of FIG. 10.

Figure 11:
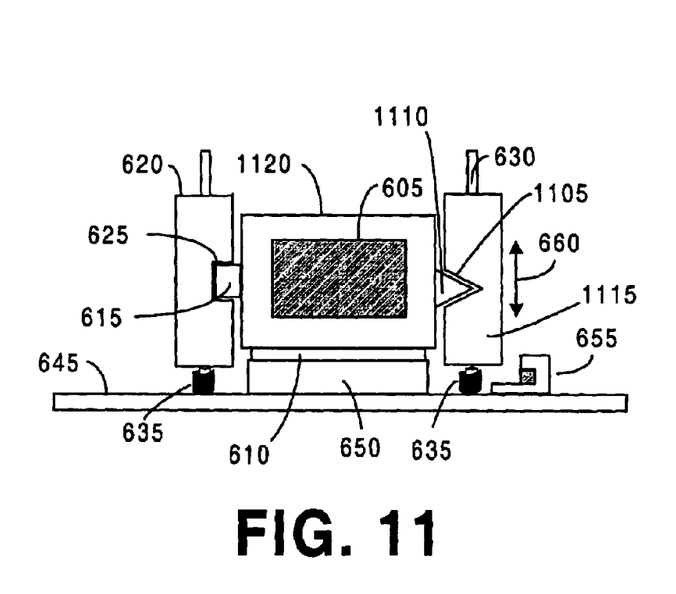
FIG. 11 shows another alternative variant in accordance with the present invention.

FIG. 11 shows another alternative variant in accordance with the present invention. As shown in FIG. 11, the guides 615, 1110 on the module 1120 are again in the form of rails but one guide 615 is the same as in FIG. 6 but the other guide 1110 has a triangular cross sectional shape. Thus, this configuration would not allow the module 1120 of FIG. 11 to be used in the frames of FIG. 6 or FIG. 10. Similarly, neither the module 600 nor the module 1000 could be used in the frame of FIG. 11.

Although the above examples in FIG. 10 and FIG. 11 used a set of rails and complementary channels for the guides, this approach is not specifically required. Instead, for example, other elements suitable for aligning, constraining and controlling insertion of the opto-electronic module into the frame can be used, for example, posts, pins or other elements. In addition, it is to be understood that the guides need not be formed as outwardly extending pieces on the module. Instead, the module can have one or more channels with the frame having complementary elements in the form of outwardly extending rails, pins or other elements that go into the channels on a module. Advantageously, with this approach, the modules can be narrower and the opening in the front panel can be made smaller because the overall insertion footprint will be smaller. Of course, different combinations of the above can also be used, including the mixing and matching of rails, pins or grooves on modules or frames. Any manner that still achieves the constraint and placement aspects described herein can be part of an implementation of the invention.

Figure 12:
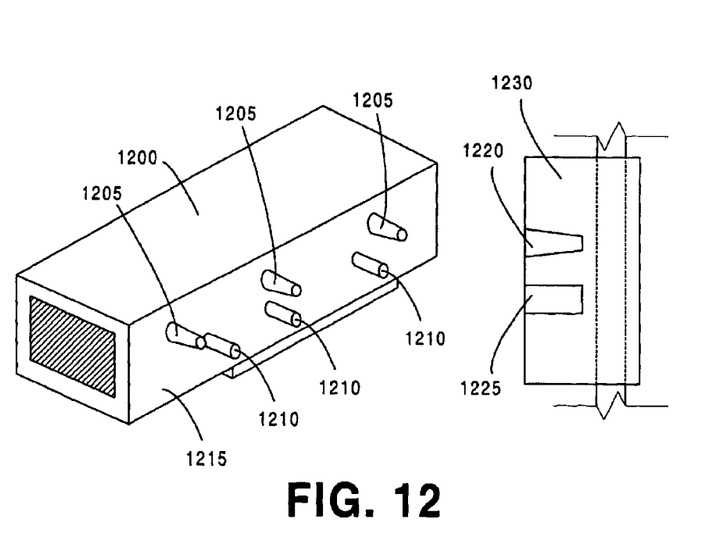
FIG. 12 shows yet another alternative variant in accordance with the present invention.

FIG. 12 shows yet another alternative variant in accordance with the present invention. As shown in FIG. 12, the optoelectronic module 1200 includes several guides 1205, 1210 in the form of multiple individual posts (only those on one 1215 side being visible). The guides 1205 in the upper row are tapered posts whereas the guides 1210 in the lower row are cylindrical posts. The rows of guides 1205, 1210 are linearly aligned for sliding into and along complementary shaped guide slots 1220, 1225 in one side of the frame 1230.

Just as different configurations and elements can perform the guide functions, other aspects can be changed or substituted. For example, instead of, or in addition to, using springs coiled about posts as described above other mechanisms to move the frame can be used.

For example, in other alternative variants of the present invention, a variety of types of springs including coil, helical, leaf and torsion springs can be used to urge the frame into a normally disengaged position. The following are a few representative illustrative examples showing, for purposes of simplification, only the relevant details.

Figure 13:
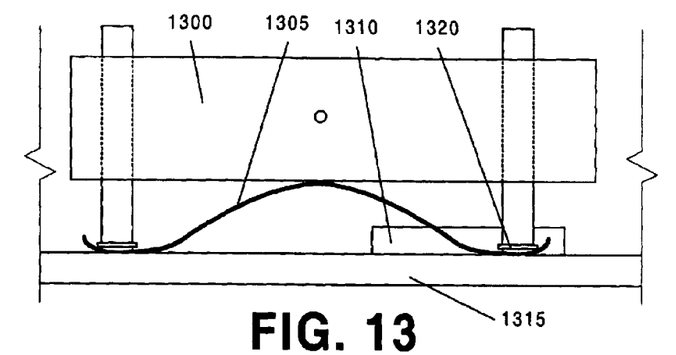
FIG. 13 shows another alternative variant in accordance with the present invention.

FIG. 13 shows one such example alternative variant suitable for use in an implementation of the invention. As shown in FIG. 13, instead of using individual coil springs about the posts along which the frame moves, as described above, this variant incorporates a leaf spring 1305 located between the frame 1300 and the circuit board 1315. In the normal position, the leaf spring 1306 is fully bowed and the frame 1300 merely rests on the top of the bowed portion. In some implementations, it may be necessary to prevent movement of the spring in undesirable directions, for example, when the spring is unloaded. This can be accomplished many different ways too numerous to name. For purposes of completeness, one simple example is provided with the understanding that others can be readily substituted without the application of anything more than a basic understanding of mechanical engineering. In the example, the ends of the spring 1305 are split to form a pair of tines, with one tine on one end being on one side of the post and the other tine on that end being on the other side of the post. As the spring 1305 is compressed, the split/tines constrain the movement to essentially only follow along the length of the split. In addition, a bent or highly curved portion 1310 near each end of the spring 1305 in conjunction with a retainer element, such as a clip, channel or flange 1320 is used to keep the spring ends from undesirable upward movement or and prevent either end from passing beyond the post. In this implementation, movement of the frame 1300 from the disengaged towards the engaged position, for example to seat a module inserted into the frame 1300, compresses the leaf spring and causes the two ends to move away from each other such that, at the maximum compression point, the electrical connector on the bottom of an inserted module will be mated to the electrical connector 1310 on the circuit board 1315.

Figure 14:
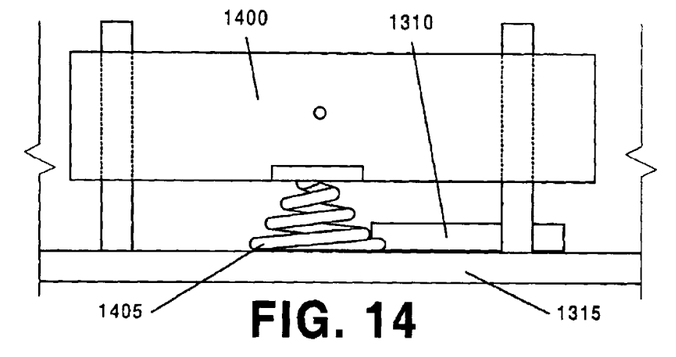
FIG. 14 shows another alternative variant in accordance with the present invention.

FIG. 14 shows another example alternative variant suitable for use in an implementation of the invention using a helical coil spring 1405. As shown in FIG. 14, the frame 1400 is urged into a disengaged position by the helical coil spring 1405 positioned underneath a "wing" 1410 attached to a side of the frame 1400.

Figure 15:
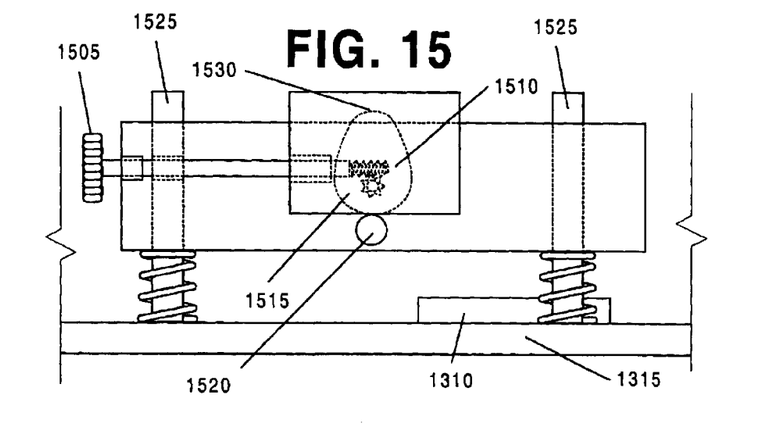
FIG. 15 shows a further variant in accordance with the present invention.

FIG. 15 shows yet another representative example more complex variant of a frame moving mechanism in accordance with the present invention. As shown in FIG. 15, a rotatable knob 1505 is coupled to gears 1510 via a shaft 1515. A cam 1515 is configured with an appropriate profile so that, when the knob 1505 is rotated, the cam 1515 applies a force to a fixed element 1520 on the frame 1520 and thereby causes it to move down the posts 1525 and compress the springs 1535 until the peak 1530 of the cam 1515 is touching the element 1520. At this point, when the frame 1520 contains a module, the electrical connector of the opto-electronic module will be fully coupled to the electrical connector 1310 on the circuit board 1315. Reverse (or as shown further) rotation of the knob 1505 eases the compression of the springs 1535 and thereby causes the frame 1520 to move back toward the normally disengaged position.

In yet other variants of the present invention a spring need not be used at all—all that is required is some mechanism that moves the frame between the disengaged and engaged positions. For example, by movably coupling cam 1515 of FIG. 15 to the element 1520, an arrangement can be formed that will move the frame in the directions that cause mating and un-mating of the two electrical connectors without the use of a spring at all.

In addition, in some variants, the movement of the frame need not be purely linear, nor must it be in only one direction. For example, the movement could be in two linear directions so that the frame itself can be configured to slide in the plane of insertion and perpendicular to it to, for example, to cause the frame to be closer to the face plate when no module is present and thereby facilitate acceptance of a module.

Figure 16:
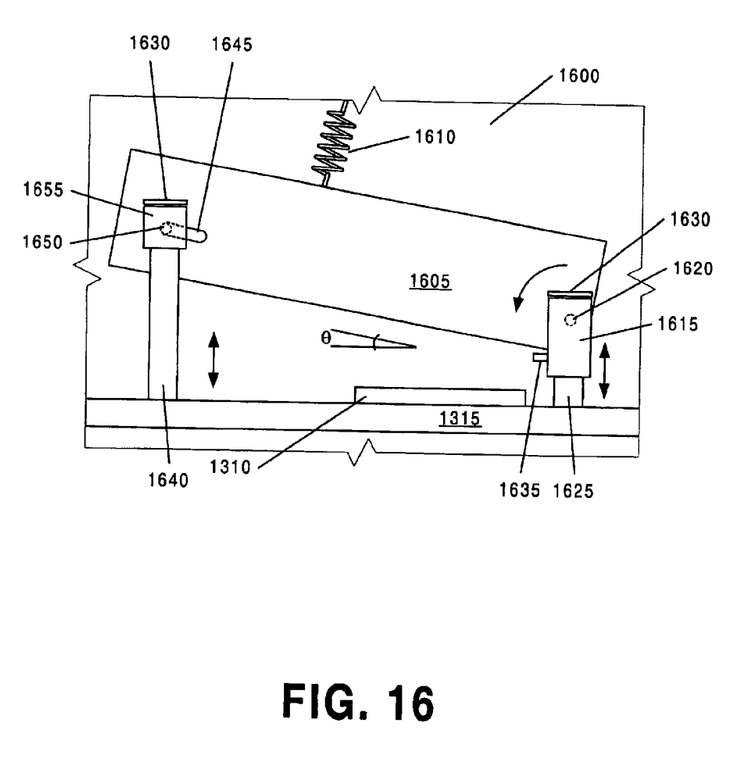
FIG. 16 shows another variant in accordance with the present invention.

In another example, a portion of the movement could be a pivoting or arcuate movement. FIG. 16 shows a simplified representative further example variant of a frame moving mechanism in accordance with the present invention involving pivoting or arcuate movement in addition to movement perpendicular to the connector 1310.

As shown in FIG. 16, the mechanism 1600 is made up of a frame 1605 configured to accept an opto-electronic module as described above. A spring 1610, located above the frame 1605 and connected to it, is used to maintain the frame 1605 in a normally disengaged position. The rear of the frame is connected to a rear collar 1615 by a pin 1620 that allows the frame to move about the pin 1620. The rear collar is itself movable along a post 1625 of a specified height. In addition, a flange 1630 on the collar acts as a pivot stop to prevent the frame 1605 from moving in a pivotal manner beyond a parallel to the circuit board 1315. Near the front of the frame 1605 is another post 1640 that is taller than the rear post 1625. Each of the front and rear posts 1625, 1640 have a stopper 1630 on its top to prevent the spring 1610 from pulling the frame 1605 off of the posts 1625, 1640. A slot 1645 and pin 1650 arrangement couples the frame 1605 to a front collar 1655 to accommodate pivoting of the frame 1605. The front collar 1655 is also slidably moveable along the front post 1640. As a result, the operation of this mechanism is as follows. When a module is inserted into the frame 1605, it is at an angle θ with respect to the connector 1310. A lever, cam or other element (not shown) is used to apply a force to the frame 1605 that extends the spring 1610 and causes the frame 1605 (and accordingly the module) to move both in an arc and along the posts 1625, 1640 until, immediately before the connector on the module mates with the connector 1310 on the board 1315, the two are parallel to each other. Depending upon the particular implementation, this may involve complete movement through an arc angle θ before any movement along the rear post 1625 occurs or some combination of movement along the post 1625 during the pivotal movement.

At this point it is to be understood that, for each implementation described herein, the connector on the module will be parallel to the connector on the board immediately before the two electrical connectors mate, irrespective of their orientation relative to each other at the time of module insertion through the front panel.

In view of all of the above, it should be appreciated that through use of the invention, much larger connectors can be used with a given size module in a given size front loading rack than was otherwise possible. This advantage is shown most clearly in the simplified modules of FIG. 17*a* through 17*c*.

Figure 17:
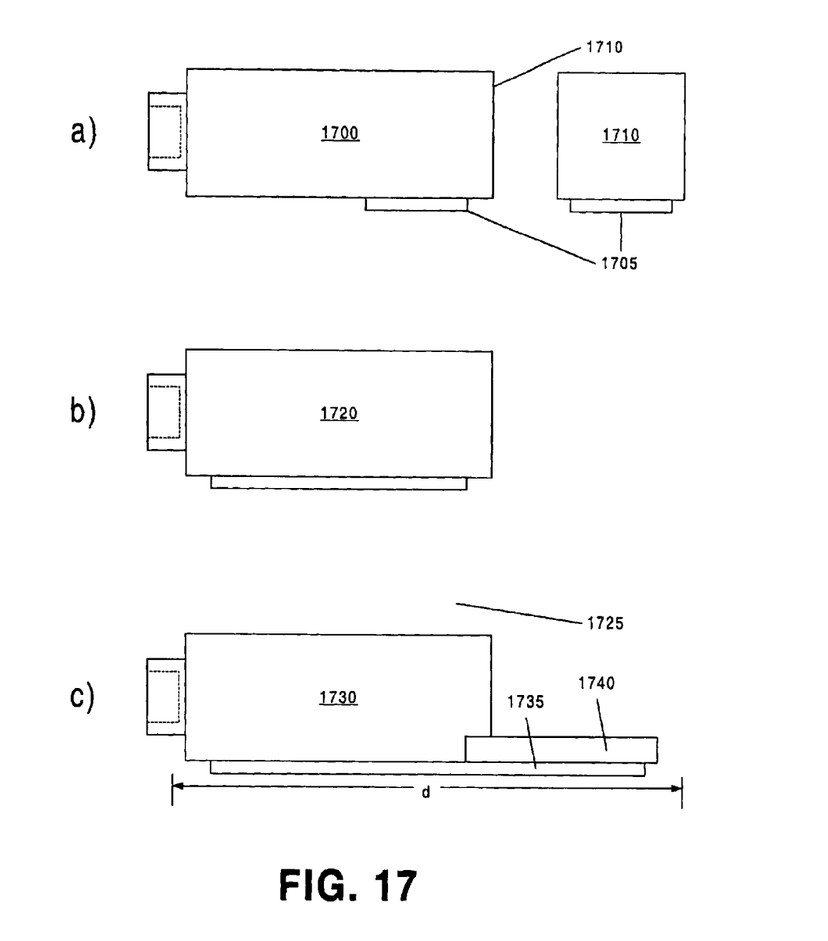
FIG. 17a through 17c show simplified examples of opto-electronic modules suitable for use with the present invention.

FIG. 17*a* shows an opto-electronic module 1700 suitable for use with the invention having an electrical connector 1705, equal in size to the rear footprint 1710 of the module 1700, and located on its bottom side 1715.

FIG. 17*b* shows a second module 1720, identical in body size to the module of FIG. 17*a* except it has an electrical connector 1725 that is 50% larger than the electrical connector 1705 shown in FIG. 17*a*.

FIG. 17*c* shows yet another opto-electronic module 1730, also identical in body size to the module of FIG. 17*a*. However, in this case, it has an electrical connector 1735 that is significantly longer than the electrical connectors 1705, 1725 shown in FIG. 17*a* and FIG. 17*b* to the point of extending well beyond the end of the body of the module 1730. Of course, in such a case, it may be desirable to provide a support 1740 of some sort to provide rigidity to the overhanging part of the connector 1735 and/or to act as a conduit for wiring (not shown) that is provided to pins of the electrical connector 1735 located in the overhanging portion beyond the end of the body. Should a sufficiently long connector be used such that a support 1740 must be used, in such a case, it is unimportant from the standpoint of the invention whether the support 1740 is part of, attached to, or wholly independent of body of the opto-electronic module.

As a result, and as shown in FIG. 17*c*, through use of the invention with a given size opto-electronic module, the size of the electrical connector is only really constrained by the total available depth of a rack ("d") since increasing the length of the connector will not increase the insertion footprint of a given module.

Having described several different examples, it should be apparent that individual aspects may also be modified or implemented differently without departing from the invention to achieve additional or alternative advantages. For example, if a lock of some sort is used to constrain a module in the mated position, it need not be part of circuit board. Instead it could be part of some other component including the frame, the faceplate, or some other part of a rack drawer, to name a few. Similarly, the frame need not be affixed to the circuit board, but instead could be affixed to or part of the drawer or even could be affixed to a board, in a hanging configuration, above the connector to which the module will connect. In addition, instead of using one or more springs to urge the frame into a "normally disengaged position" one or more springs could be used to urge the frame into a normally "engaged" position, whether or not the frame contained a module. In such an arrangement, a lever, screw, cam or other element would be used to move the frame from the normally engaged position to a disengaged position so that a module could be inserted or removed. In addition, in some arrangements having a normally engaged configuration, it will be advantageous, although not necessary, to use a locking mechanism to maintain the frame in the disengaged position during module insertion or removal.

It should therefore be understood that the above description is only representative of illustrative embodiments. For the convenience of the reader, the above description has focused on a representative sample of possible embodiments, a sample that is illustrative of the principles of the present invention. The description has not attempted to exhaustively enumerate all possible variations. That alternate embodiments may not have been presented for a specific portion of the invention, or that further undescribed alternate embodiments may be available for a portion, is not to be considered a disclaimer of those alternate embodiments. Other applications and embodiments can be straightforwardly implemented without departing from the spirit and scope of the present invention. It is therefore intended, that the invention not be limited to the specifically described embodiments, since numerous permutations and combinations of the above and implementations involving non-inventive substitutions for the above can be created, but the invention is to be defined in accordance with the claims that follow. It can be appreciated that many of those undescribed embodiments are within the scope of the following claims, and others are equivalent.

What is claimed is:

1. A method of connecting an optoelectronic module, having an optical connector and a first electrical connector, the first electrical connector defining a plane substantially perpendicular to a plane defined by the optical connector, to a surface having a second electrical connector configured for mating with the first electrical connector, the method comprising:

inserting the optoelectronic module into a holder along the plane of the second electrical connector;

moving the holder so as to align the first and second electrical connectors with respect to each other; and connecting the first and second electrical connectors together by moving the optoelectronic module along the plane defined by the optical connector.

2. The method of claim 1, wherein the inserting further comprises:

aligning a guide disposed on the optoelectronic module with a complementary guide disposed on the holder.

3. The method of claim 1, wherein the moving further comprises:

bringing together an opening, associated with one of the optoelectronic module or holder, and a tapered pin.

4. The method of claim 1, further comprising:

locking the holder in place following the connecting of the first and second electrical connectors together.

5. The method of claim 1, further comprising:

unlocking the holder; and disengaging the first and second electrical connectors from each other by moving the holder.

6. An apparatus to cause the mating of two complementary electrical connectors each comprising a two dimensional array of connection points, a first connector being located on an optoelectronic module and a second connector being located on a circuit board, the apparatus comprising:

means for receiving the optoelectronic module in a direction substantially along a plane defined by the first connector;

means for bringing the first and second connectors into alignment relative to each other; and means for moving the first connector in a direction substantially perpendicular to the plane and causing the connection points of the first connector to engage the complementary connection points of the second connector.

7. The apparatus of claim 6, wherein the means for receiving further comprises:

guide means for controlling the receipt of the optical module.

8. The apparatus of claim 7, wherein the guide means comprises one of:

a rail, a post, a channel, an externally extending volume or an internally extending volume.

9. The apparatus of claim 6, wherein the means for moving comprises:

a lever, a knob, or a cam.

10. The apparatus of claim 6, further comprising:

means for maintaining the means for receiving in a normally disengaged position.

11. The apparatus of claim 10 wherein the means for maintaining comprises a spring.

12. The apparatus of claim 11, wherein the spring comprises:

a leaf spring or a torsion spring.

13. A system for connecting a first electrical connector of an optoelectronic module to a second electrical connector of a surface, the system comprising:

a holder;

a first guide on the optoelectronic module, wherein the guide controls a proper insertion of the optoelectronic module into the holder by defining a plane of insertion;

a second guide on the holder, complementary to the first guide; and a movement mechanism coupled to the holder and constructed to move the holder in a direction perpendicular to the second connector immediately prior to the first electrical connector connecting with the second electrical connector; and a holder lock that will maintain the holder in a fixed position once the first electrical connector is connected with the second electrical connector.

14. The system of claim 13, wherein the first guide comprises at least one of:

a rail, a post, a channel, an externally extending volume or an internally extending volume.

15. The system of claim 14, wherein the second guide comprises:

a rail, a post, a channel, an externally extending volume or an internally extending volume complementary in configuration to the first guide.

16. The system of claim 13, further comprising:

a tapered alignment pin located on the holder.

17. The system of claim 13, further comprising:

an alignment boss located on the holder.

18. The system of claim 17 further comprising:

a tapered alignment pin disposed for mating with the alignment boss.

19. A method comprising:

receiving an optoelectronic module in a first direction through an opening in a front panel of a rack; and coupling an electrical connector of the module to a complementary electrical connector by movement of the module, within the rack, in a second direction different from the first direction.

20. The method of claim 19 further comprising:

maintaining the optoelectronic module in a coupled state following the coupling.

21. A method for connecting an optoelectronic module to a circuit board, the method comprising:

slidingly receiving an optoelectronic module, having an electrical connector including a two dimensional array of electrical connection points defining a plane and an optical connector defining our optical interface surface perpendicular to the plane, by movement of the optoelectronic module along the plane; and engaging the electrical connector with an electrically complementary connector on a circuit board by movement of the optoelectronic module in a direction perpendicular to the plane immediately prior to the electrical connector at the electrically complementary connector being joined.

* * * * *